(12) United States Patent
Sabourdy et al.

(10) Patent No.: US 8,913,645 B2
(45) Date of Patent: Dec. 16, 2014

(54) LASER CAVITY WITH CENTRAL EXTRACTION BY POLARISATION FOR COHERENT COUPLING OF INTENSE INTRA-CAVITY BEAMS

(75) Inventors: David Sabourdy, Orléans (FR); Jean-Eucher Montagne, Orléans (FR); Alain Barthelemy, Limoges (FR); Agnes Desfarges-Berthelemot, Couzeix (FR); Vincent Kermene, Aixe sur Vienne (FR); Sandrine Auroux, Limoges (FR); Julien Guillot, Ladignac le Long (FR); Brigitte Serreault, Sceaux (FR); Bruno Esmiller, Villennes sur Seine (FR)

(73) Assignees: Compagnie Industrielle des Laser CILAS, Orléans (FR); Astrium SAS, Suresne (FR)

( * ) Notice: Subject to any disclaimer, the term of this patent is extended or adjusted under 35 U.S.C. 154(b) by 0 days.

(21) Appl. No.: 13/696,259

(22) PCT Filed: May 4, 2011

(86) PCT No.: PCT/FR2011/051009
§ 371 (c)(1),
(2), (4) Date: Jan. 16, 2013

(87) PCT Pub. No.: WO2011/138559
PCT Pub. Date: Nov. 10, 2011

(65) Prior Publication Data
US 2013/0121364 A1   May 16, 2013

(30) Foreign Application Priority Data
May 7, 2010  (FR) ..................................... 10 01963

(51) Int. Cl.
| | |
|---|---|
| *H01S 3/08* | (2006.01) |
| *H01S 3/07* | (2006.01) |
| *H01S 3/05* | (2006.01) |
| H01S 3/23 | (2006.01) |
| H01S 3/11 | (2006.01) |
| H01S 3/10 | (2006.01) |
| H01S 3/082 | (2006.01) |

(52) U.S. Cl.
CPC ... *H01S 3/05* (2013.01); *H01S 3/07* (2013.01); H01S 3/2383 (2013.01); H01S 3/11 (2013.01); H01S 3/10053 (2013.01); H01S 3/08 (2013.01); H01S 3/082 (2013.01)
USPC ................................. 372/106; 372/99; 372/98

(58) Field of Classification Search
CPC ... H01S 3/08054; H01S 3/08; H01S 3/10053; H01S 3/11; H01S 3/05
USPC ........................................ 372/106, 99, 98, 92
See application file for complete search history.

(56) References Cited

U.S. PATENT DOCUMENTS

| | | | | |
|---|---|---|---|---|
| 5,793,784 | A * | 8/1998 | Wagshul et al. | ................. 372/32 |
| 7,555,024 | B2 * | 6/2009 | Ishaaya et al. | ........... 372/29.023 |
| 2003/0128732 | A1 * | 7/2003 | Ishizu | .............................. 372/75 |
| 2005/0008059 | A1 * | 1/2005 | Nunokawa et al. | ............. 372/98 |

FOREIGN PATENT DOCUMENTS

| | | |
|---|---|---|
| DE | 19920033 A1 | 11/2000 |
| EP | 0587154 A2 | 3/1994 |
| WO | 98/56087 A1 | 12/1998 |

OTHER PUBLICATIONS

Tondusson et al., "Coherent combination of four laser beams in a multi-axis Fourier cavity using a diffractive optical element", Journal of Optics A: Pure and Applied Optics; Institute of Physics Publishing. Bristol, GB; vol. 3, No. 6, pp. 521-526; Nov. 1, 2004, XP020080811.
Sarkies et al., "A stable YAG resonator yielding a beam of very low divergence and high output energy", Optics Communications, North-Holland Publishing Co., Amsterdam, NL; vol. 31, No. 2, pp. 189-192; Nov. 1, 1979, XP024537518.

* cited by examiner

*Primary Examiner* — Kinam Park
(74) *Attorney, Agent, or Firm* — Duane Morris LLP; J. Rodman Steele, Jr.; Gregory M. Lefkowitz

(57) ABSTRACT

The invention relates to a laser cavity with central extraction by polarisation for coherent coupling of intense intra-cavity beams. The laser cavity (1) according to the invention comprises an extraction unit (7) with central extraction, which divides the laser cavity (1) longitudinally into two functional portions (P1, P2), namely a first portion (P1) including the active components (3), which amplifies the laser beams (4), and a second portion (P2) which performs coherent coupling of the laser beams (4).

10 Claims, 3 Drawing Sheets

Figure 1:
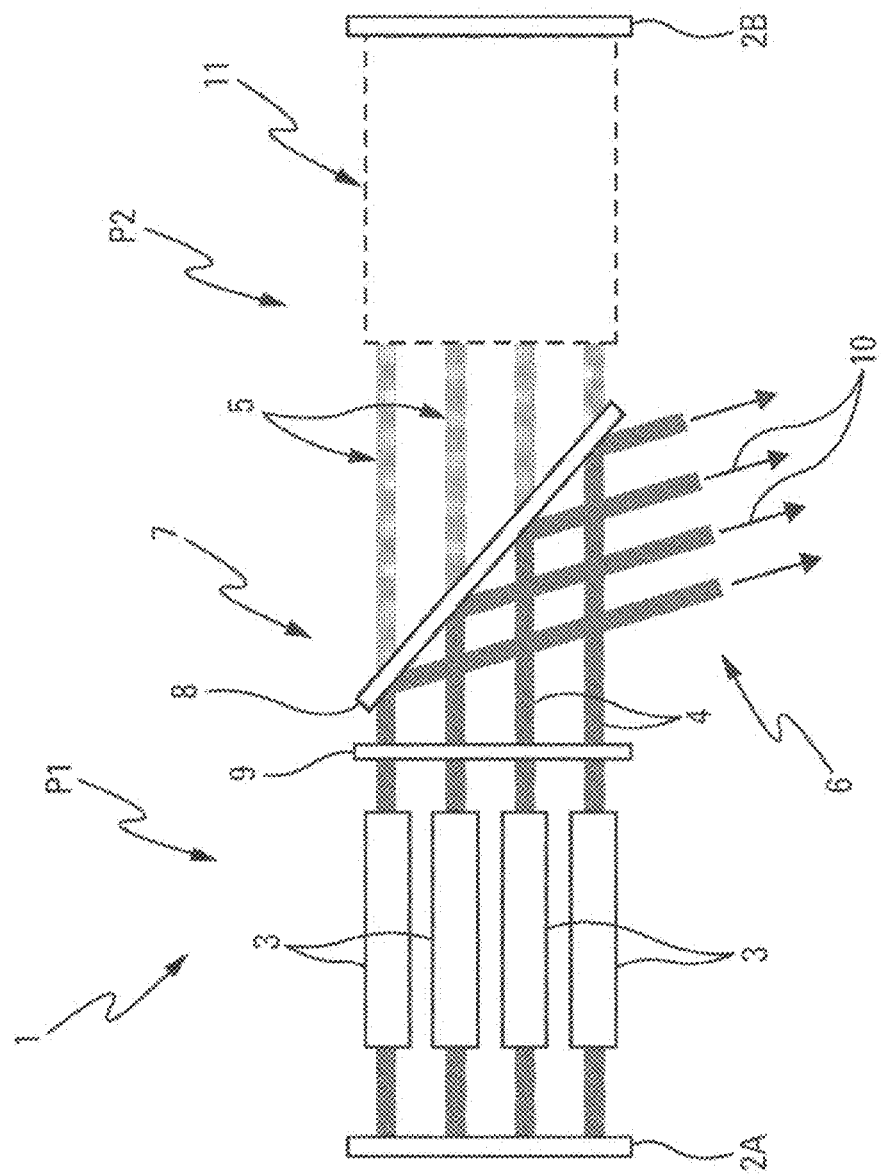

LASER CAVITY WITH CENTRAL EXTRACTION BY POLARISATION FOR COHERENT COUPLING OF INTENSE INTRA-CAVITY BEAMS

CROSS-REFERENCE TO RELATED APPLICATIONS

This application is a §371 national stage entry of International Application No. PCT/FR2011/051009, filed May 4, 2011, which claims priority to French Patent Application No. 1001963 filed May 7, 2010, the entire contents of which are incorporated herein by reference.

The present invention relates to a modular laser cavity for passive coherent coupling of high-intensity laser beams by means of central extraction by polarisation. It further relates to a laser source comprising a laser cavity of this type.

It is known that the purpose of a laser cavity is to produce and extract a laser ray, and that for this purpose it comprises in particular:
- two mirrors which oppose one another so as to define said laser cavity; and
- at least one active element (or laser amplifier), which is arranged between these two mirrors and which can absorb a pump beam so as to amplify a laser beam propagating along a propagation axis.

The present invention is applicable to passive coherent coupling of laser amplifiers, with the object of increasing the brightness of the laser source.

Laser beams are generally passively phase-locked by fully or partially superposing, intra-cavity (that is to say within the laser cavity), at a given point or in a given region, the different beams to be coupled, which come from different amplification means and are arranged mutually parallel. Subsequently, at the superposition location, a spatial or spectral constraint which is common to the beams is applied. In the moments before the laser emission, under the action of one or more pump sources, the different amplification means emit a white noise over the entire spectral emission band of these means. As a result of the spatial or spectral constraint imposed in the region which is common to the beams, this white noise is filtered and then re-amplified during the successive reflections within the cavity. The laser system automatically organises the emission spectrum thereof by re-amplifying only the resonance frequencies which are compatible with minimum intra-cavity losses. Thus, since the level of losses after filtering is less than the effective gain in the laser, the laser emission is produced.

The useful beam or beams are always extracted downstream from the coupling by an output coupler.

Laser systems with passive phase-locking generally comprise:
- at least one pump source, which may be based on monochromatic sources, of which the emission spectrum matches the absorption spectrum of the active means under consideration (laser diode), or on a wide-band source (flash lamps, the sun etc.);
- a plurality of N active elements (doped crystals, doped fibre, gas cell, semiconductor) arranged mutually parallel in a common laser cavity; and
- either a beam-combining or beam-splitting optical element (separating plates in series, diffractive element), for superposing the N beams along a common axis, or an element with which spatial filtering can be carried out (diaphragm, wire grating, engraved plate etc.) and on which the beams are superposed in a common plane (focal plane of a convergent lens or of a faceted prism).

There are various passive phase-locking configurations:
- with separating plates in series (or dendritic structure). In this configuration, the laser system forces the elementary beams to interfere with one another where they intersect, at the separating plates, so as eventually to result in just a single beam, having the same spatial features as the elementary beams and having an intensity which is theoretically the sum of the intensities of the elementary beams;
- with a diffractive coupling ("Dammann grating"). In this configuration, the elementary beams cross in a plane where a diffractive element is arranged, which acts as a multiple-path separator. As in the above configuration, the beams have to interfere constructively towards a single common path, from which a beam should emerge having an intensity close to the sum of the intensities of the elementary beams;
- with a spatial filtering using an engraved mirror or an opaque-wire grating. In this configuration, the different elementary beams cross in a given plane, or an engraved plate or an opaque-wire grating is provided and produces intensity minima of a particular interference (or diffraction) pattern, which is the pattern that the different beams would produce when superposed if they were in phase. This pattern, produced by an engraving or by wires which lead to losses in the different beams, thus forces said beams to phase-lock so as to minimise these losses during the reflections in the cavity; and
- with a spatial filtering using a diaphragm at the focus on a convergent lens. In this configuration, the different elementary beams are superposed at the focus of a convergent lens which is arranged so as to produce a Fourier transform. A diaphragm of a carefully defined diameter is arranged at the focus of this lens. When the elementary beams are in phase, the diffraction pattern resulting at the focus of the lens comprises a predominant narrow central lobe and small satellite lobes. The diameter of the diaphragm is thus adjusted so as only to allow a beam of the size of the anticipated central lobe to pass through, so as to force the elementary beams to phase-lock so as to minimise the losses.

In the above examples, the constraints which are imposed intra-cavity make it possible to phase-lock the elementary beams and thus to make them mutually coherent.

The main idea behind phase-locking laser sources is to be able to exceed the laser power or energy which can be delivered by a single source, while maintaining a high beam quality. Indeed, when the energy limit for a single elementary source has been reached, the idea is to couple coherently a number N of elementary laser sources of this type, then to combine the N emitted beams into a single beam of greatly increased intensity.

At present, to reach very high powers (in the range of 100 kW) with continuous operation, active phase-locking systems which require permanent analysis and slaving of the phase of each emitter are preferred, even though they are very complex, expensive and bulky. In these systems, the N emitters are distributed in a periodic 2D matrix and the combination takes place in the far field.

However, with pulsed operation (on the nanosecond scale), these active devices do not seem to be compatible, as a result of the rapidity of the event as compared with the excessively slow dynamic—due to the electronic device for slaving and computer-processing the data—of actively establishing the common phase. Currently, to reach maximum energies of several kilojoules, a small pulsed oscillator is used, followed by a long series of multi-path amplifiers.

In the context of conventional laser sources having very high gain and very high power in continuous operation (several kW) or having high energy in pulsed operation (several J), the power density levels are often very high, or even close to the flux capacity limit of some optical components or processes. Also, if it is desired to develop these laser sources so as to reach the maximum energies by means of currently existing passive intra-cavity coherent coupling techniques, which require localised superposition of the different beams to be coupled on one or more optical components, serious problems arise with the flux capacity of these components.

To solve these problems it is necessary:
either to provide new optical equipment and processes which support the necessary fluence;
or to decrease the fluence of the beams in the sensitive superposition region.

However:
the flux capacity of the optical equipment or of the processes has to he larger as the number of lasers to be coupled increases, and this quickly becomes limiting; and
as regards decreasing the fluence of the beams, it would be conceivable simply to dilate the area thereof, but this dilation requires larger sizes of optical components as the number of lasers to be coupled increases. Moreover, this dilation also leads to stability problems with the laser cavity and to problems with maintaining the beam quality in the case of solid-state lasers.

The present invention relates to a new laser cavity structure, using preferably high-gain amplification means, for high powers or energies, in association with a passive coherent coupling technique, which makes it possible (without the constraint of additional equipment) to push back greatly the limit, resulting from the flux capacity of the optical components, on the number of lasers which can be coupled.

More specifically, the present invention relates to a laser cavity which makes it possible to push back the limit—which is linked to the problems of the flux capacity of the optical components—on the number of active elements which can be coupled when the coherent coupling technique used requires different elementary beams to be combined on one or more fluence-limited elements.

According to the invention, said laser cavity, which makes it possible to produce at least one laser ray and which comprises:
two mirrors which oppose one another so as to define said laser cavity;
a plurality of active elements, which are arranged mutually parallel and of which the propagation axes are also mutually parallel, said active elements being arranged between these two mirrors and being able to undergo pumping so as to amplify the laser beams; and
an extraction unit, which is arranged in said laser cavity and which is formed no as to carry out a central extraction of the laser beams to obtain the laser ray,
is notable because said extraction unit comprises at least one polariser, which is at an inclination to said propagation axes, and at least one retardation element, which is arranged longitudinally upstream from said polariser (either between said active elements and said polariser or upstream from said active elements), and in that said extraction unit is arranged in said laser cavity so as to divide it longitudinally into two functional parts, namely a first part comprising said active elements, which amplifies said laser beams, and a second part, which coherently couples said laser beams.

The design of the structure according to the invention thus provides the possibility of dividing the laser cavity, in line, into two functional parts, in which the laser beams are extracted through the centre, a first part having the function of amplifying the different laser beams in parallel and the second part having the primary function of coherently coupling these beams. According to the invention, the laser cavity is formed so as to coherently couple the laser beams by superposition in said second part.

The central extraction of the elementary laser beams (that is to say from said individual active elements of the laser cavity) preferably takes place after the amplification phase, in such a way that the intensity thereof is greatly decreased, in the proportions of the extraction rate under consideration, upon arrival in the common region (second part) where the beams are to be coherently coupled.

Thus, once the intensity of each elementary beam has been greatly reduced, they can be superpositioned safely in the common zone, taking into account the fluence limit.

As stated above, the beams are extracted centrally by associating a polariser and a phase retardation element (preferably a $\lambda/4$ or quarter-wave phase retardation plate) which is placed between the polariser and the cavity base mirror which closes up the amplification region. Thus, as long as the amplification means (active elements) used is not or is only slightly birefringent, rotating the phase retardation element can make it possible to develop the overvoltage factor of the laser cavity (that is to say the percentage of the flux from the active amplification elements which remains in the cavity upon crossing the polarises) continuously from 0% to 100%. Indeed, a beam which is square-polarised by the polariser passes twice through this phase retardation element, which will have the effect of rotating the polarisation state of the beam through a particular angle, depending on the selected orientation of the neutral axes thereof. During the return, the portion of the polarised beam along the same axis as the axis of the polariser will be transmitted by the polariser and will therefore continue to circulate within the cavity. By contrast, the portion of the beam which is polarised perpendicular to the axis of the polariser will be rejected by said polariser, making it possible to extract the beam centrally by means of the polarisation.

Moreover:
in a first variant embodiment, said extraction unit comprises a plurality of assemblies formed by a polariser and a retardation element, namely a separate assembly for each of said active elements (amplifiers); and
in a second variant embodiment, said extraction unit comprises a single assembly formed by a polariser and a retardation element, which is common to all of said active elements (amplifiers) of the laser cavity.

The present invention brings about a major advantage when longitudinal high-gain amplification means (active elements) are used, which make strong extraction of the beam by reflection possible. Indeed, strong central extraction makes it possible to decrease the intensity of the beam greatly downstream from the extraction. As a result, the number of beams which can be combined in the laser cavity before reaching the damage limit is increased.

By way of example, consider the case where the laser source (using the laser cavity according to the invention) consists of identical active elements (arranged mutually parallel), and the generated beams have a fluence which is at the flux capacity limit of the optical components through which they pass. If, in this situation, the overvoltage factor is 20%, that is to say 20% of the flux from the amplification means remains in the laser cavity upon crossing the polariser and 80% of this flux is extracted from the laser cavity by said polariser, the maximum number of beams which can be combined or superposed in the coupling region (second part of the laser cavity) is five, so as to meet the fluence level which is tolerated by the laser source. Likewise, if the overvoltage level imposed on the laser cavity is 5% with the same fluence constraints as before, the number of beams which can be coupled is twenty.

The central extraction technique according to the invention is compatible with all of the known coherent coupling techniques which require intra-cavity superposition of laser beams.

Moreover, in a particular embodiment, the laser cavity according to the invention further comprises at least one trigger element which is arranged in the second part, namely either trigger elements on each of the different paths before superposition or a single trigger element at the location of the superposition of the laser beams. This particular embodiment makes it possible to provide a Q-switch laser system, which can emit a plurality of pulsed beams in phase.

Moreover, advantageously, the laser cavity according to the invention further comprises at least one auxiliary active element which is arranged in said second part, making it possible to increase the beam extraction rate at the polariser.

Moreover, in a preferred embodiment, said laser cavity also comprises means for arranging the laser beams mutually parallel, upstream from the extraction unit or even via the extraction unit, in such a way that they are combined outside said laser cavity (after extraction), at a higher efficiency.

The present invention further relates to a laser source comprising at least:
 a laser cavity comprising active elements;
 a pump system for emitting at least one pump beam; and
 an optical transport system for directing the pump beam towards said active elements of said laser cavity.

According to the invention, this laser source is notable in that said laser cavity is of the aforementioned type.

The figures of the appended drawings will provide a good understanding of how the invention may be carried out. In the drawings, like reference numerals denote similar elements.

FIGS. 1 to 5 show schematically particular embodiments of laser cavities according to the invention.

The laser cavity 1 (or optical cavity) according to the invention, which is shown schematically in different embodiments in FIGS. 1 to 5, is for use in a laser source.

In addition to said laser cavity 1, a laser source of this type (not shown) comprises, in the conventional manner, in particular:
 a conventional pump system, which comprises means which can emit at least one pump beam; and
 a conventional optical transport system, which is intended to direct the pump beam emitted by the pump system into said laser cavity 1, so as to pump active elements 3 which are detailed below.

Said laser cavity 1 comprises, in the conventional manner:
 two opposing mirrors 2A and 2B which define this laser cavity 1; and
 a plurality of active elements 3. An active element 3 is an amplification element. Each amplification element comprises a doped material which can absorb the pump beam (not shown) emitted by the pump system so as to amplify a corresponding laser beam 4 which propagates along a propagation axis 5.

The laser cavity 1 provides the laser ray 6, which is extracted as detailed below, with the directional (arrow 10) and geometric features thereof.

Said mirrors 2A and 2B are fully reflective, and said laser cavity 1 further comprises an extraction unit 7 which is arranged in said laser cavity 1 and which is formed so as to provide central extraction of the laser beams 4 so as to obtain said laser ray 6. Central extraction refers to extraction which is carried out substantially in the centre of the laser cavity 1, and not at the sides via an end mirror such as the mirror 2B.

Moreover, said extraction unit 7 comprises:
 at least one polariser 8, which is at an inclination to said (mutually parallel) propagation axes 5; and
 at least one phase retardation element 9, which is arranged longitudinally upstream from said polariser 8. Said element 9 can be arranged upstream from the active elements 3. Preferably, as shown in the drawings, it is arranged longitudinally between said active elements 3 and said polariser 8 and is passed through by the laser beams 4. This retardation element 9 is preferably a quarter-wave plate. A phase retardation element 9 makes it possible to produce a phase displacement in a laser beam 4 which passes through it.

The polariser 8 is a beam separation polariser, which separates the incident beam into two beams having different polarisations.

In the context of the present invention, as shown in FIGS. 1 to 5, said laser cavity 1 comprises a plurality of active elements 3, which are arranged mutually parallel and of which the corresponding axes of propagation 5 of the laser beams 4 are mutually parallel. Moreover, according to the invention, the extraction unit 7 is arranged in said laser cavity 1 so as to divide it longitudinally into two functional parts P1 and P2, namely a part P1 (on the left of the drawings) comprising said active elements 3 which amplify said laser beams 4, and a part P2 (on the right of the drawings) which coherently couples said laser beams 4, as detailed below.

The design of the aforementioned structure thus provides the possibility of dividing the laser cavity 1, in line, into two functional parts P1 and P2, in which the laser beams 4 are extracted via the centre, a first part P1 having the function of amplifying the different laser beams 4 in parallel and the second part P2 having the primary function of coherently coupling these beams 4. According to the invention, the laser cavity 1 is formed so as to coherently couple the laser beams 4 in said second part P2 by superposition, as is illustrated by way of a common region 11 in FIGS. 1 to 5.

The elementary laser beams 4 (that is to say the ones from said individual active elements 3) are preferably extracted centrally after the amplification phase, in such a way that the intensity thereof is greatly decreased on arrival in the common region 11 where the beams 4 are to be coherently coupled.

Thus, once the intensity of each elementary beam 4 has been greatly reduced, they can be safely superposed in the common region 11 taking into account the fluence limit of the optical components involved in this combination of the beams 4.

As stated above, the beams 4 are extracted centrally by associating a polariser 8 and a phase retardation element 9 (preferably a λ/4 or quarter-wave phase retardation plate) which is placed between the poiariser 8 and the cavity base mirror 2A which closes up the amplification region. Thus, as long as the amplification means used (active elements 3) is not or is only slightly birefringent, rotating the phase retardation element 9 can make it possible to develop the overvoltage factor of the laser cavity 1 (that is to say the percentage of the flux from the active amplification elements 3 which remains in the cavity 1 upon crossing the polariser 8) continuously from 0% to 100%. Indeed, a beam which is square-polarised by the polariser 8 passes twice through this phase retardation element 9, which Will have the effect of rotating the polarisation state of the beam through a particular angle, depending on the selected orientation of the neutral axes thereof. During the return, the portion of the polarised beam along the same axis as the axis of the polariser 8 will be transmitted by the polariser 8 and will therefore continue to circulate within the cavity 1. By contrast, the portion of the beam which is polarised perpendicular to the axis of the polariser 8 will be rejected by said polariser, making it possible to extract the beam centrally by means of the polarisation.

Moreover, in a first variant embodiment (not shown), said extraction unit comprises a plurality of assemblies formed by a polariser and a retardation element, namely a separate assembly for each of said active elements (amplifiers).

Furthermore, in a second variant embodiment (shown in FIGS. 1 to 5), said extraction unit 7 comprises a single assembly formed by a polariser 3 and a retardation element 9, which is common to all of said active elements 3 (amplifiers) of said laser cavity 1.

It will be noted that the central extraction technique according to the invention is compatible with all of the known coherent coupling techniques which require intra-cavity superposition of laser beams 4.

Figure 2:
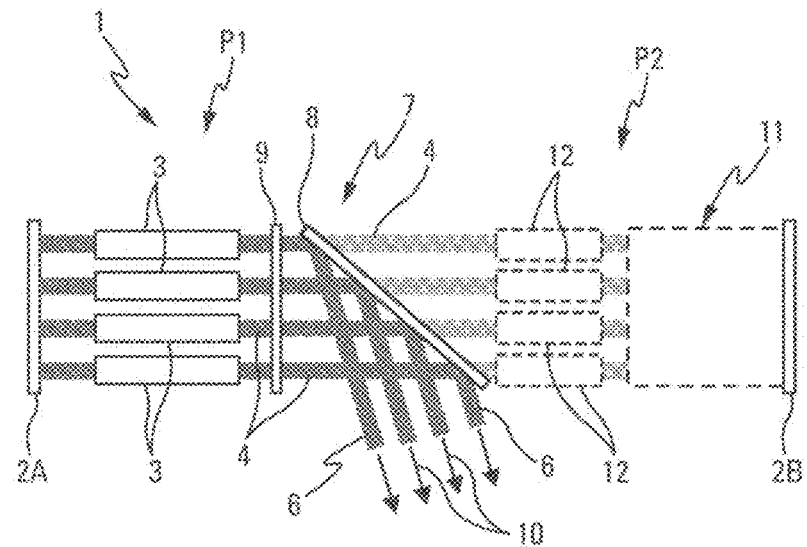
Figure 3:
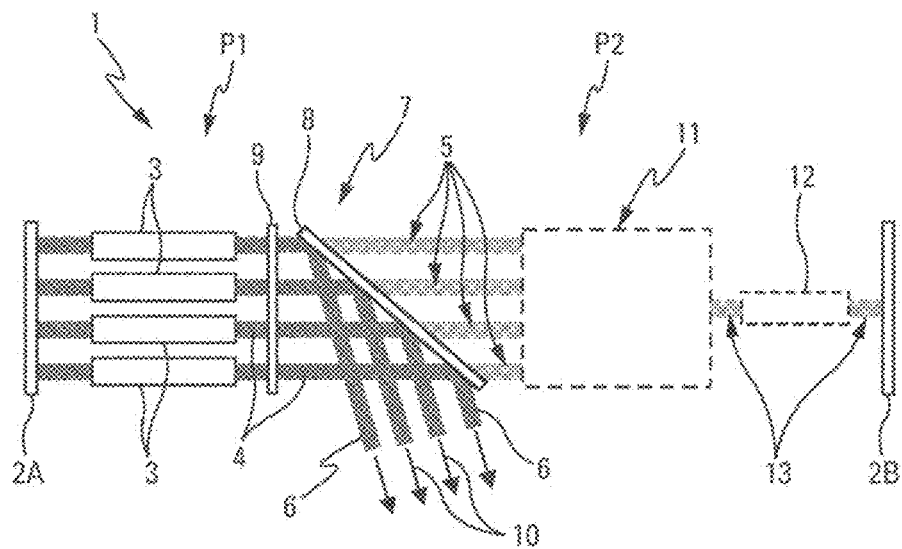

Moreover, as shown in FIGS. 2 and 3, the laser cavity 1 according to the invention may further comprise at least one trigger element 12 which is arranged in the part P2 and which makes it possible to emit a plurality of pulsed beams in phase. This particular embodiment makes it possible to provide a Q-switch laser system. In this case:

in a first variant embodiment, shown in FIG. 2, the laser cavity 1 comprises a plurality of triggers 12, each of which is mounted on one of the paths (with axis 5) of the laser cavity 1. A path refers to the propagation direction which is associated with an active element 3 and in which the laser beam 4 associated with this active element 3 is emitted; and in a second variant embodiment, shown in FIG. 3, said laser cavity 1 comprises a single trigger element 12 which is common to all of the active elements and which is arranged on a path 13 where the laser beams 4 are combined in the part P2.

Figure 4:
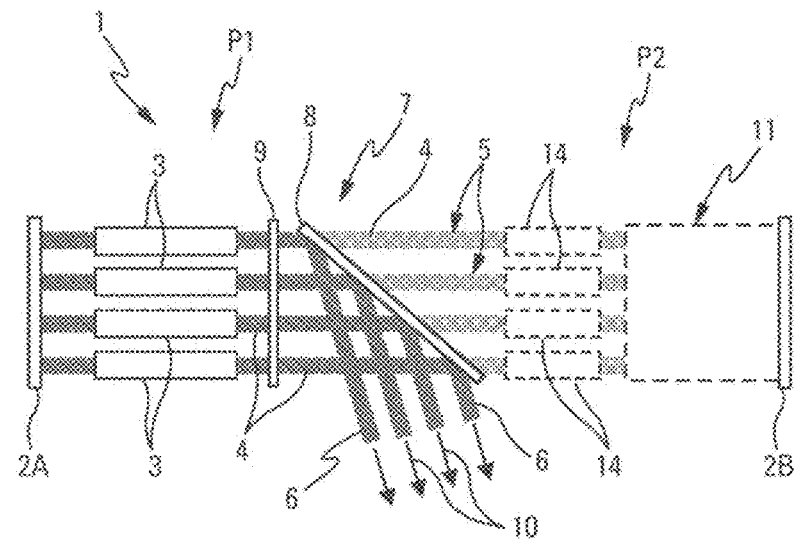
Figure 5:
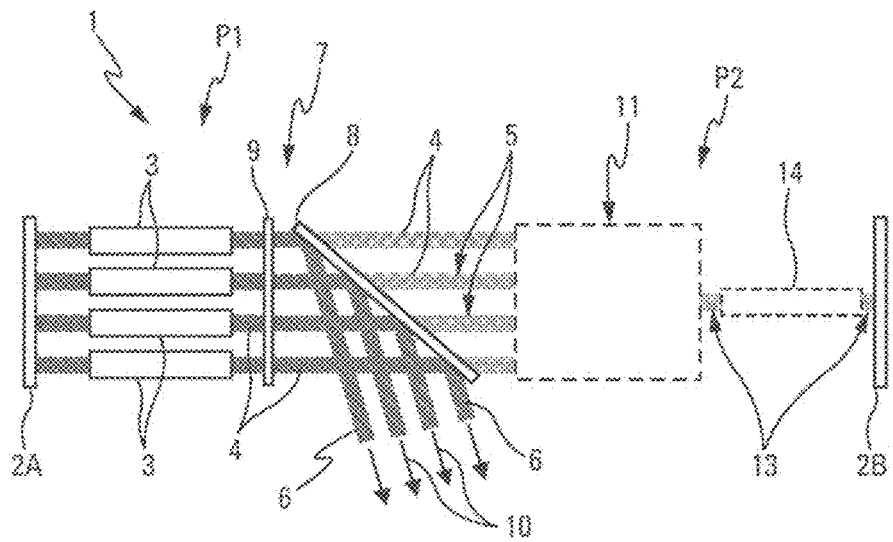

Moreover, in a particular embodiment, said laser cavity 1 may comprise additional active elements (amplifiers) 14 which are arranged in said second part P2 of the laser cavity 1, as shown in FIGS. 4 and 5.

In a first variant embodiment, shown in FIG. 4, the laser cavity 1 comprises a plurality of auxiliary active elements 14, each of which is associated with one of the paths of the laser cavity 1. By contrast, in a second variant embodiment, shown in FIG. 5, the laser cavity 1 comprises a single auxiliary active element 14 which is arranged on a path 13 where the individual beams 4 are combined.

This particular embodiment makes it possible to increase the extraction rate of the beams 4 at the polariser 8. The additional amplification (due to the auxiliary active elements 14) has to be such that the intensities of the combined beams after a reflection in the laser cavity 1 are identical to what they would have been without altering the extraction rate and without adding the additional amplification. Thus, the overvoltage level is artificially preserved by means of the additional amplification, whilst making it possible to extract more energy from the laser source.

It will be noted that once they are coherently coupled inside the laser cavity 1, the different beams which are extracted via the centre of this laser cavity 1 can be combined. These laser beams 4, which are coherent from then onwards, can be combined in far fields, in free space, without having to cross additional components. To achieve this, the laser cavity 1 is formed so as to arrange the beams periodically, preferably in a two-dimensional matrix, just before the extraction. In this way, the rays 6 can interfere in far fields, so as to form a diffraction pattern containing an intense central peak accompanied by lower-intensity satellite lobes, in accordance with the quality of the spatial distribution and the pointing of the elementary beams, upon exiting the laser cavity 1.

The present invention therefore brings about a major advantage when longitudinal high-gain amplification means (active elements 3) are used, which make strong extraction of the beam by reflection possible. Indeed, strong central extraction makes it possible to decrease the intensity of the beam 4 greatly downstream from the extraction. As a result, the number of beams 4 which can be combined in the laser cavity 1 before reaching the damage limit is increased.

The invention claimed is:

1. A laser cavity, which makes it possible to produce at least one laser ray (6) and which comprises:
   at least two mirrors (2A, 2B);
   a plurality of active elements (3) having propagation axes (5), said active elements (3) being arranged between these two mirrors (2A, 2B) and being able to undergo pumping so as to amplify the laser beams (4);
   an extraction unit (7), which is arranged in said laser cavity (1), which comprises at least one polariser (8) which is at an inclination to said propagation axes (5), and which is formed, so as to carry out a central extraction of the laser beams (4) to obtain the laser ray, said extraction unit (7) being arranged in said laser cavity (1) so as to divide it longitudinally into two functional parts (P1, P2), of which a first part (P1) comprising said active elements amplifies said laser beams (4),
   wherein said extraction unit (7), which comprises at least one retardation element (9) which is arranged longitudinally upstream from said polariser (8), divides the laser cavity (1) longitudinally so as to form a second part (P2); and
   a common region in said second part which coherently couples said laser beams (4) by superposition to form a combined laser beam that follows a single path (13) and is reflected by the second mirror (2B).

2. The laser cavity according to claim 1, wherein said extraction unit (7) comprises a plurality of assemblies formed by a polariser and a retardation element, namely a separate assembly for each of said active elements.

3. The laser cavity according to claim 1, wherein said extraction unit (7) comprises a single assembly formed by a polariser (8) and a retardation element (9), which is common to all of said active elements (3).

4. The laser cavity according to claim 1, further comprising at least one trigger element (12) which is arranged in the second part (P2), for emitting pulsed beams in phase.

5. The laser cavity according to claim 1, further comprising at least one auxiliary active element (14) which is arranged in said second part (P2).

6. The laser cavity according to claim 1, comprising means for shaping the laser beams (4) upstream from the extraction unit, in such a way that they combine outside said laser cavity (1) after the extraction.

7. A laser source, comprising
   a laser cavity (1) comprising active elements (3);
   a pump system for emitting at least one pump beam; and
   an optical transport system for directing the pump beam towards said active elements (3) of said laser cavity (1),
   wherein said laser cavity (1) is of the type specified in claim 1.

8. The laser cavity according to claim 1, wherein the extraction unit (7) centrally extracts each laser beam (4), thereby reducing the intensity of each laser beam (4) entering the common region.

9. The laser cavity according to claim 8, wherein the central extraction is achieved by positioning the at least one phase retardation element between the at lease one polariser (8) and the cavity base mirror (2A).

10. The laser cavity according to claim 1, wherein the combined laser beam is reflected by the second mirror (2B).

* * * * *